(12) United States Patent
Belson et al.

(10) Patent No.: US 7,602,625 B2
(45) Date of Patent: Oct. 13, 2009

(54) SYSTEMS AND METHODS FOR SEPARATION OF A FRONT END RECTIFIER POWER SYSTEM

(75) Inventors: Steve Belson, Plano, TX (US); Eric Peterson, McKinney, TX (US); Robert Guenther, Pepperell, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 11/627,618

(22) Filed: Jan. 26, 2007

(65) Prior Publication Data

US 2008/0179960 A1 Jul. 31, 2008

(51) Int. Cl.
*H02M 7/04* (2006.01)
(52) U.S. Cl. ........................................ 363/65
(58) Field of Classification Search .................. 363/65, 363/67, 69, 70
See application file for complete search history.

(56) References Cited

U.S. PATENT DOCUMENTS

| 5,612,581 | A | * | 3/1997 | Kageyama | ............... 307/64 |
| 5,894,414 | A | * | 4/1999 | Jiang | ................... 363/65 |
| 7,274,175 | B2 | * | 9/2007 | Manolescu | ............ 323/267 |
| 2002/0085399 | A1 | | 7/2002 | Brooks et al. | |
| 2002/0145895 | A1 | * | 10/2002 | Liu | ..................... 363/65 |
| 2003/0002305 | A1 | * | 1/2003 | Takeuchi | ................ 363/65 |
| 2008/0179960 | A1 | * | 7/2008 | Belson et al. | ............ 307/82 |

* cited by examiner

*Primary Examiner*—Jeffrey L Sterrett

(57) ABSTRACT

Systems and methods of converting alternating current (AC) power into direct current (DC) power at an intermediate DC voltage are disclosed. Briefly described, one system embodiment comprises a separated front end rectifier system that provides intermediate voltage, direct current (DC) power to a plurality of loads, comprising a modular alternating current to direct current (AC/DC) rectifier coupled to an AC power system that converts received AC power to DC power at a rectified DC voltage, a rectified DC voltage bus coupled to the AC/DC rectifier and at least one modular direct current to direct current (DC/DC) conversion unit coupled to the rectified DC voltage bus and to an intermediate DC voltage bus.

17 Claims, 7 Drawing Sheets

SYSTEMS AND METHODS FOR SEPARATION OF A FRONT END RECTIFIER POWER SYSTEM

TECHNICAL FIELD

Embodiments are generally related to an intermediate direct current (DC) power network and, more particularly, are related to systems and methods for separating a front end rectifier power system.

BACKGROUND

Centralized electronic systems, such as a communication network system or a parallel computer processing system, employ a variety of electronic devices residing in a housing or other suitable enclosure. One type of electronic device included in such systems is the front end rectifier.

The front end rectifier converts alternating current (AC) power into an intermediate direct current (DC) power. Power is received from an AC distribution system, which may be, for example, a 120 volt AC or 240 volt AC system. Electronic rectifying devices convert the received AC power (AC current and AC voltage) into DC power (DC current and DC voltage). Intermediate DC voltage may be, for example, at 48 volts or 12 volts DC, though any suitable intermediate DC voltage may be used depending upon the system design.

FIG. 1 is a simplified block diagram illustrating a conventional front end rectifier 102. Within the front end rectifier 102 is an alternating current to direct current (AC/DC) rectifier 104 and a direct current to direct current (DC/DC) voltage conversion unit 106.

The AC/DC rectifier 104 receives AC power, via connection 108. Connection 108 is illustrated as a single line for convenience, and may be a plurality of wire connections depending upon the nature of the AC power source. The received AC power is converted to DC and output at a voltage that corresponds to the voltage of the AC power source, referred to as the rectified DC voltage. The rectified DC voltage is provided to the DC/DC voltage conversion unit 106, via connection 110.

The DC/DC voltage conversion unit 106 converts the received rectified DC voltage into an intermediate DC voltage. The intermediate DC voltage is provided to the intermediate DC voltage bus 112, via connection 114.

DC power, at the intermediate DC voltage, is then provided to a plurality of DC/DC converter output modules 116a-i, via connections 118. The DC/DC converter output modules 116a-i convert the received intermediate DC voltage into a load DC voltage required by the loads 120a-i, via connections 122. Accordingly, DC current is determined by the loading requirements of the loads 120a-i, plus resistive losses, in the system.

An exemplary power supply system is illustrated and described in U.S. patent application Ser. No. 09/753,056 to Brooks et al., published as publication 2002/0085399, which is herein incorporated by reference in its entirety. Accordingly, individual components of the front end rectifier 102, the AC/DC rectifier 104, the DC/DC voltage conversion unit 106, the DC/DC converter output modules 116a-i and the loads 120a-i are not described in detail herein. Furthermore, various other configurations of components are known that provide the same or similar functionality.

As a simplified illustrative example, assume that the front end rectifier 102 receives three phase, 120 volt AC power. The AC/DC rectifier 104 converts the received 120 volt AC power into a rectified DC voltage that corresponds to 120 volts. Then, the DC/DC voltage conversion unit 106 converts the rectified DC voltage to an intermediate DC voltage, which may be, for example, 48 volts. The DC/DC converter output modules 116a-i receive the intermediate DC voltage, via the intermediate DC voltage bus 112, and convert the received DC voltage to the voltage used by loads 120a-i. Examples of load voltages may be 12.5 volts DC, 5 volts DC or 3.5 volts DC, as illustrated in Brooks et al.

FIG. 2 is a perspective view of the front end rectifier 102 illustrated in FIG. 1. The front end rectifier 102 is configured as a modular unit for convenience. Such modular front end rectifiers 102 may be easily installed or replaced. An enclosure (not shown) facilitates the installation and/or replacement of a modular front end rectifier 102 by providing slots, guides, receptacles or other suitable structure such that a front end rectifier 102 may be easily inserted into position in the enclosure.

Typically, a front end rectifier 102 has a length dimension based upon, in part, the design of the enclosure. Another factor determining the length of the front end rectifier 102 is the layout of the components in the AC/DC rectifier 104 and the DC/DC voltage conversion unit 106.

A connector 202 is provided on the front end rectifier 102 that facilitates easy coupling of the output of the DC/DC voltage conversion unit 106 to the intermediate DC voltage bus 112. For example, the connector 202 may be a blade configured to couple to a receptacle residing on the intermediate DC voltage bus 112. Alternatively, the connector 202 may be a coupling mechanism configured to couple to a portion of the intermediate DC voltage bus 112 that is configured as a bar or other solid structure.

Conventional electronic systems may employ a single front end rectifier 102. The intermediate DC power is distributed to the DC/DC converter output modules 116a-i over the above-described intermediate DC voltage bus 112. The "capacity" of the single front end rectifier 102 is determined, in part, by the total load drawn by the loads of the various electronic devices residing in the enclosure. "Capacity" is the total amount of power that can be converted and/or transmitted by a device or component. Typically, the capacity of the AC/DC rectifier 104 and the DC/DC voltage conversion unit 106 are approximately equal.

Thus, a single front end rectifier 102 may be relatively large when the electronic system has a large number of electronic devices residing in the enclosure and/or or has electronic devices that draw a large amount of DC current. A large single front end rectifier 102 inherently has several disadvantages. Illustrative disadvantages are described below, although there may be other disadvantages not explicitly described herein.

First, when a single relatively large front end rectifier 102 is used, the initial cost is relatively high. For example, the front end rectifier 102 can be designed with sufficient capacity to accommodate the maximum possible load of all electronic devices that may ultimately be installed in the enclosure. That is, initially, capacity of the front end rectifier 102 may not be fully utilized. (Presumably, a smaller front end rectifier sized with a capacity corresponding to the initial loading is less expensive than a larger front end rectifier 102). Thus, the initial installation of a single relatively large front end rectifier 102 (with sufficient capacity for the planned ultimate loading) may be more expensive because of the initial unused capacity.

As noted above, if the initial load of the electronic devices was less than the planned ultimate load, a smaller (less capacity) front end rectifier can be installed initially. However, as the load increases over time, at some point, the smaller front end rectifier should be replaced with the larger front end rectifier 102. Thus, the later installation of the relatively larger capacity front end rectifier 102 may be more expensive because of the added cost of buying both the larger and the smaller front end rectifiers, plus the added installation cost of the later installed larger front end rectifier 102.

Furthermore, the front end rectifier 102 may be relatively long in its physical length since it includes the AC-DC rectifier 104 in series with the DC/DC voltage conversion unit 106. This relatively long length of a conventional front end rectifier 102 (the length illustrated in FIG. 2) may have an adverse impact, or may have a limiting impact, on the design of the enclosure because the total enclosure length will be, in part, determined by the length of the front end rectifier 102.

A single front end rectifier 102 may be subject to a single contingency loss. That is, when the front end rectifier 102 fails, or a component residing in the single front end rectifier fails, the system may become inoperable because of a loss of power. Thus, some system designs require a redundant power supply, resulting in the use of two (or more) single front end rectifiers 102. Additionally, some designs require the use of two (or more) different AC sources (e.g., from separate AC grids). For instance, in combination with two single front end rectifiers 102 for power supply redundancy, accommodating two separate AC sources requires 2N+2 front end rectifiers 102 or N+1 front end rectifiers 102 for each AC grid. Such system designs can consume valuable space and increase costs, among other problems.

BRIEF DESCRIPTION OF THE DRAWINGS

The components in the drawings are not necessarily to scale relative to each other. Like reference numerals designate corresponding parts throughout the several views.

DETAILED DESCRIPTION

Disclosed herein are various embodiments of separated front end rectifier power systems and methods. "Separated" refers to a feature found in certain embodiments disclosed herein whereby functionality of the front end rectifier, such as front end rectifier 102, is split among two or more separate and independent (modular) components (as opposed to a self-contained pair of modules like 104 and 106 found in front end rectifier 102), with at least one module corresponding to AC/DC rectifying functionality and at least one module corresponding to DC/DC voltage conversion unit functionality. One benefit achieved in such an arrangement is that for the two-AC source, redundant power supply example given above, for instance, 2N+2 AC/DC rectifiers may be used and only one N+1 DC/DC voltage conversion units are needed.

Figure 3:
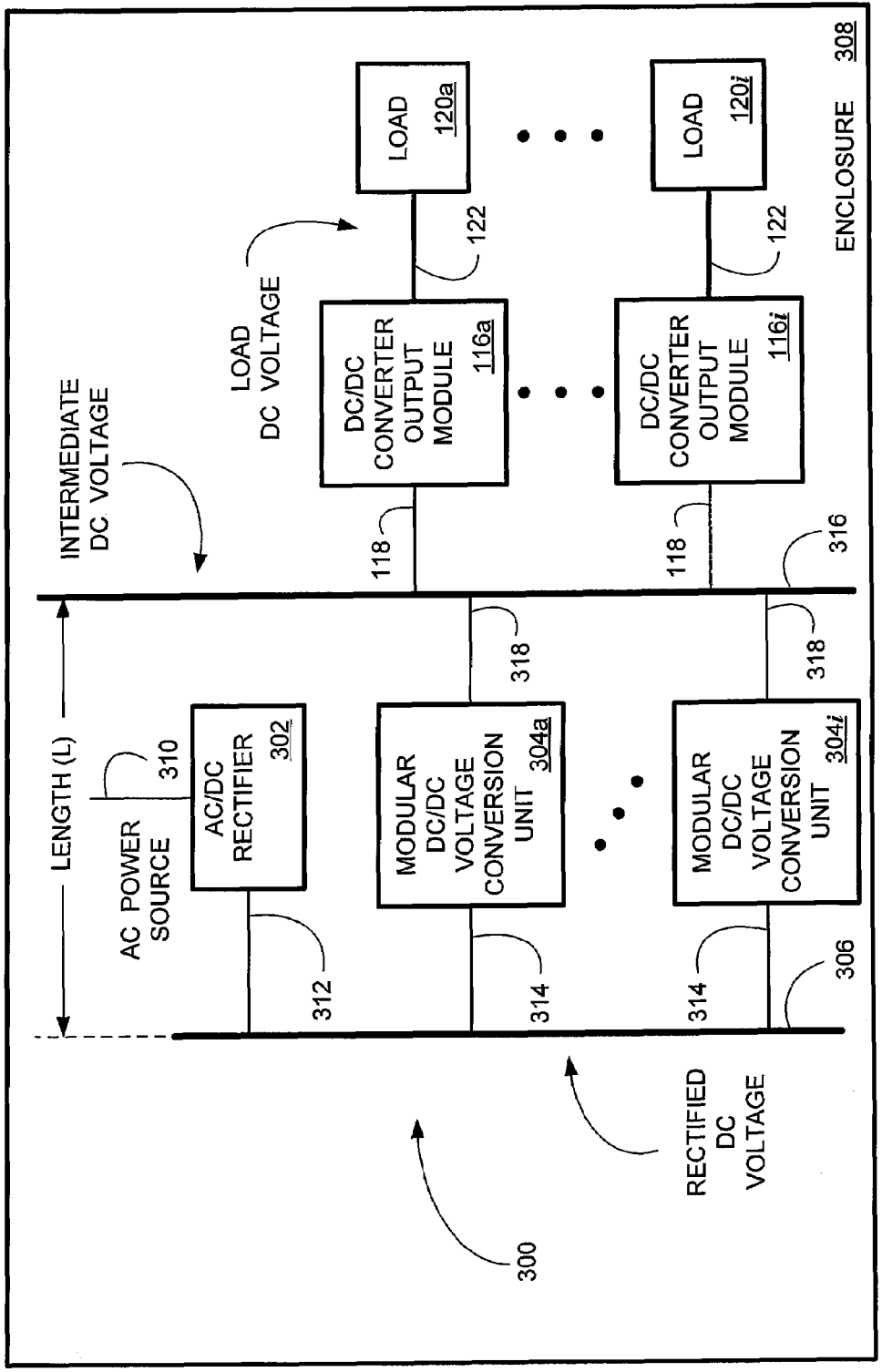
FIG. 3 is a block diagram illustrating an embodiment of a separated front end rectifier power system.

FIG. 3 is a block diagram illustrating an embodiment of a separated front end rectifier power system 300. The separated front end rectifier power system 300 comprises at least one modular alternating current to direct current (AC/DC) rectifier 302, a plurality of modular direct current to direct current (DC/DC) conversion units 304a-304i, and a rectified DC voltage bus 306. The modular AC/DC rectifier 302 and the plurality of modular direct current to direct current (DC/DC) conversion units 304a-304i are separate units that may be independently installed into an electronic system enclosure 308. (An alternative embodiment may use a single DC/DC conversion unit 304a.)

Alternating current (AC) power is received by the modular AC/DC rectifier 302 from an AC power source, via connection 310. Connection 310 is illustrated as a single connection for convenience. In various embodiments, connection 310 may be a plurality of wire connections depending upon the nature of the AC power source (for example, if AC power is provided as two-phase power or three-phase power). Alternatively, connection 310 may be implemented as a coupling device configured to couple to a corresponding device on an AC power system. For example, but not limited to, connection 310 may be a 120 volt AC plug configured to receive AC power from a suitable conventional power cord. As another non-limiting example, the AC connection 310 may itself be a power cord configured to plug into a receptacle system, such as a power supply receptacle bar or the like. It is appreciated that any type of AC power supply connectivity system may be used by various embodiments of the separated front end rectifier system 300.

Power may be received from an AC distribution system, which may be, for example, at 120 volts AC or 240 volts AC. AC power may be single-phase, two-phase or three-phase power. Frequency of the AC power may be any suitable frequency, such as, but not limited to, the 60 hertz used in the United States, or the 50 hertz used in other countries.

The received AC power is converted to direct current (DC) by the modular AC/DC rectifier 302 and output at a voltage that corresponds to the voltage of the AC power source, referred to as the rectified DC voltage. Rectified DC power/voltage/current is output onto the rectified DC voltage bus 306, via connection 312. The rectified DC power/voltage/current is provided to the modular DC/DC conversion units 304a-304i, via connections 314.

Figure 1:
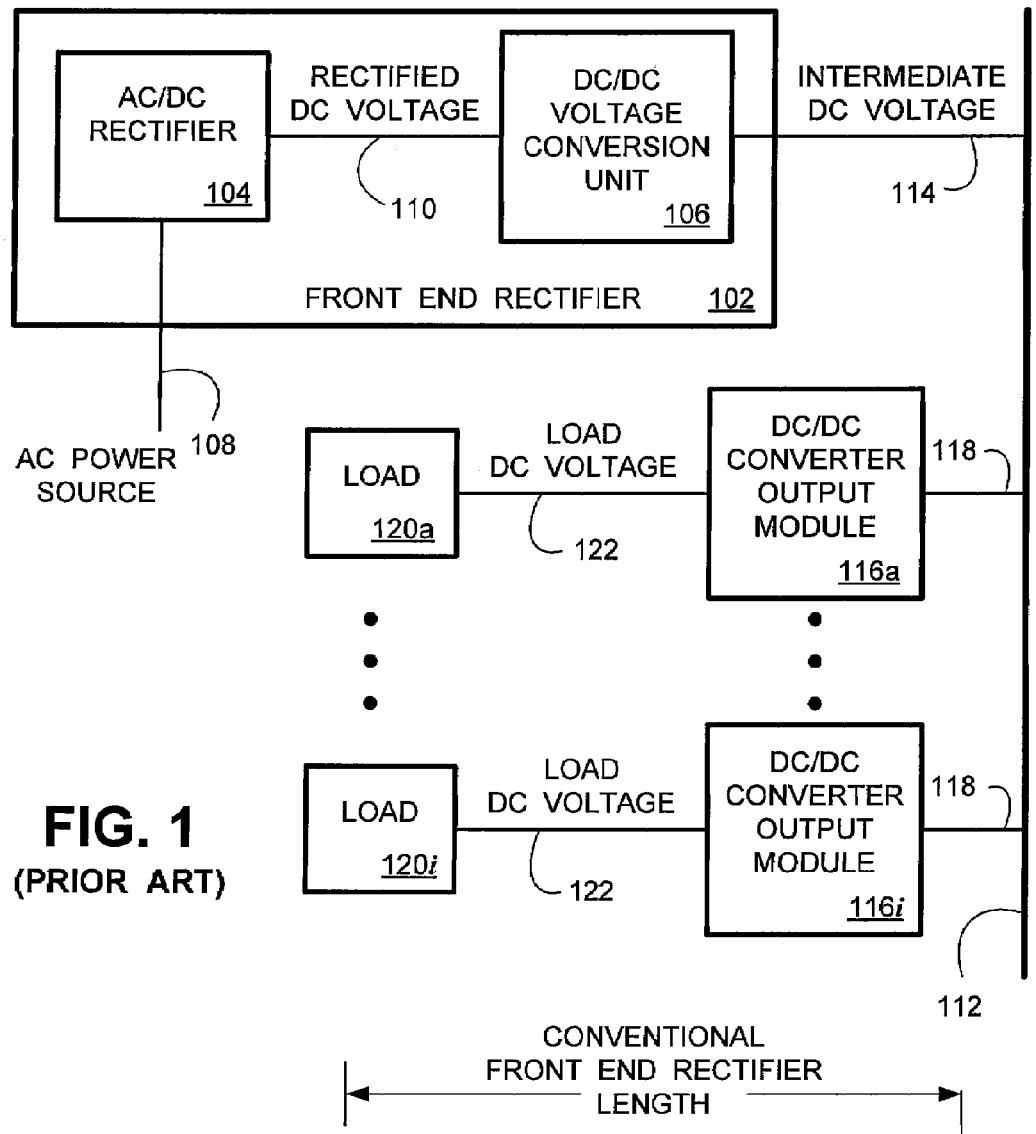
FIG. 1 is a simplified block diagram illustrating a conventional front end rectifier.

The modular DC/DC conversion units 304a-304i convert the received rectified DC voltage into an intermediate DC voltage. The intermediate DC voltage is provided to the intermediate DC voltage bus 316, via connections 318. The intermediate DC voltage bus 316 may, in some embodiments, be identical to the above-described intermediate DC voltage bus 112 (FIG. 1). In some embodiments, the intermediate DC voltage bus 316 may be configured as needed given the separated and/or modular nature of the modular DC/DC conversion units 304a-304i.

DC power, at the intermediate DC voltage, is then provided to a plurality of DC/DC converter output modules 116a-i, via connections 118, as described above. The DC/DC converter output modules 116a-i convert the received intermediate DC voltage into the load DC voltage required by the loads 120a-i, via connections 122. Accordingly, DC current is determined by the loading requirements of the loads 120a-i, plus resistive losses, in the electronic system residing in enclosure 308.

As a simplified illustrative example, assume that the modular AC/DC rectifier 302 receives three phase, 120 volt AC power. The modular AC/DC rectifier 302 converts the received 120 volt AC power into a rectified DC voltage that is output onto the rectified DC voltage bus 306. Then, the modular DC/DC conversion units 304a-304i convert the rectified DC voltage to the intermediate DC voltage that is output onto the intermediate DC voltage bus 316. The intermediate DC voltage may be, for example, 48 volts. Alternative embodiments employ other intermediate DC voltages. Then, the DC/DC converter output modules 116a-i receive DC power at the intermediate DC voltage, via the intermediate DC voltage bus 316, and convert the received DC power to a voltage used by loads 120a-i.

Figure 2:
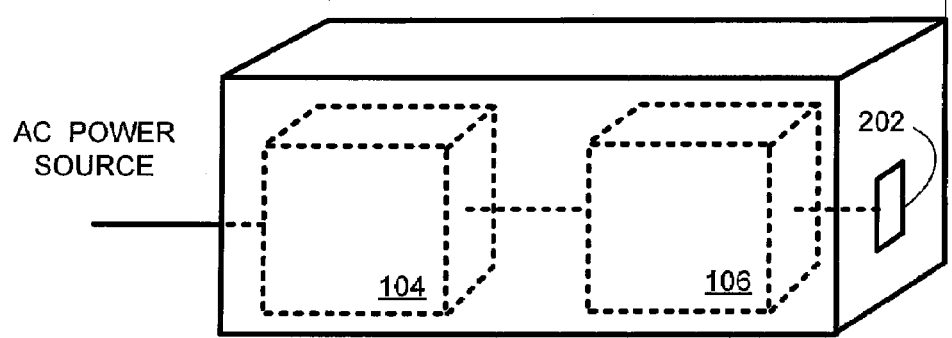
FIG. 2 is a perspective view of the front end rectifier illustrated in FIG. 1

Because the modular AC/DC rectifier 302 and the plurality of modular DC/DC conversion units 304a-304i are separate and/or modular, the length (L) required for conversion of the received AC power to the intermediate DC voltage is significantly less that the length required for the conventional front end rectifier 102 (FIGS. 1 and 2). Accordingly, greater design flexibility is provided in the layout of the various electronic components within enclosure 308.

Furthermore, because the modular AC/DC rectifier 302 and the plurality of modular DC/DC conversion units 304a-304i are separate and/or modular, the capacity of the modular AC/DC rectifier 302 may be different from the plurality of modular DC/DC conversion units 304a-304i. The ability to have different capacities for the modular AC/DC rectifier 302 and the plurality of modular DC/DC conversion units 304a-304i provides for improved reliability and reduced hardware costs for various embodiments of the separated front end rectifier power system 300.

Reliability is improved in that loss of one of the modular DC/DC conversion units 304a-304i does not result in outage of the electronic system since power is provided by the remaining modular DC/DC conversion units 304a-304i. Generally, total power required by the electronic system is first determined. Then, a reliability criteria for outage of at least one of a plurality of components of the separated front end rectifier system 300 is determined. In the example above, a single component outage criteria was illustrated. Finally, a number of the plurality of components is determined such that after outage of at least one of the components, capacity of the remaining components at least equals the determined power requirement.

For example, if the total load required is 100 watts (W), the capacity of the modular AC/DC rectifier 302 can be designed for at least 100 W. If a single contingency reliability criteria was applicable for loss of one modular DC/DC conversion unit, then three modular DC/DC conversion units 304a-304i with a capacity of 50 W each can be used in an embodiment of the separated front end rectifier power system 300. That is, upon failure of one of the three modular DC/DC conversion units 304a-304i, the two remaining modular DC/DC conversion units have a total capacity of 100 W (50 W each). As contrasted with the above-described conventional front end rectifier system, two front end rectifiers 102 may be required to provide reliability under the above-described criteria. Accordingly, the cost of one modular AC/DC rectifier 302 and three modular DC/DC conversion units 304a-304i is less that the cost of two front end rectifiers 102. Furthermore, the space required in the enclosure 308 for one modular AC/DC rectifier 302 and three modular DC/DC conversion units 304a-304i is less that the space required for two front end rectifiers 102.

As another example, if the total load required remains at 100 watts (W), and if a single contingency reliability criteria was applicable for loss of one modular DC/DC conversion unit, then six modular DC/DC conversion units 304a-304i with a capacity of 20 W each can be used in an embodiment of the separated front end rectifier power system 300. That is, upon failure of one of the six modular DC/DC conversion units 304a-304i, the five remaining modular DC/DC conversion units have a total capacity of 100 W (20 W each). Under some conditions, such a design may be desirable over the above-described conventional front end rectifier systems.

Another benefit is that some embodiments of the separated front end rectifier power system 300 may provide for convenient load expansion capability, and thereby provide further cost advantages over conventional front end rectifier systems. In the above-described example employing six modular DC/DC conversion units 304a-304i, assume that the initial load within the enclosure 308 was 40 W. Under a single contingency reliability criteria applicable for loss of one modular DC/DC conversion unit, three modular DC/DC conversion units 304a-304i with a capacity of 20 W each can be initially installed in the enclosure 308. (Upon failure of one of the three modular DC/DC conversion units 304a-304i, the two remaining modular DC/DC conversion units have a total capacity of 40 W.) As loading requirements increase with time, such as when additional devices are later added into the enclosure 308, additional modular DC/DC conversion units may be added as needed. Furthermore, the capacity of the modular DC/DC conversion units 304a-304i need not necessarily be the same.

Figure 4:
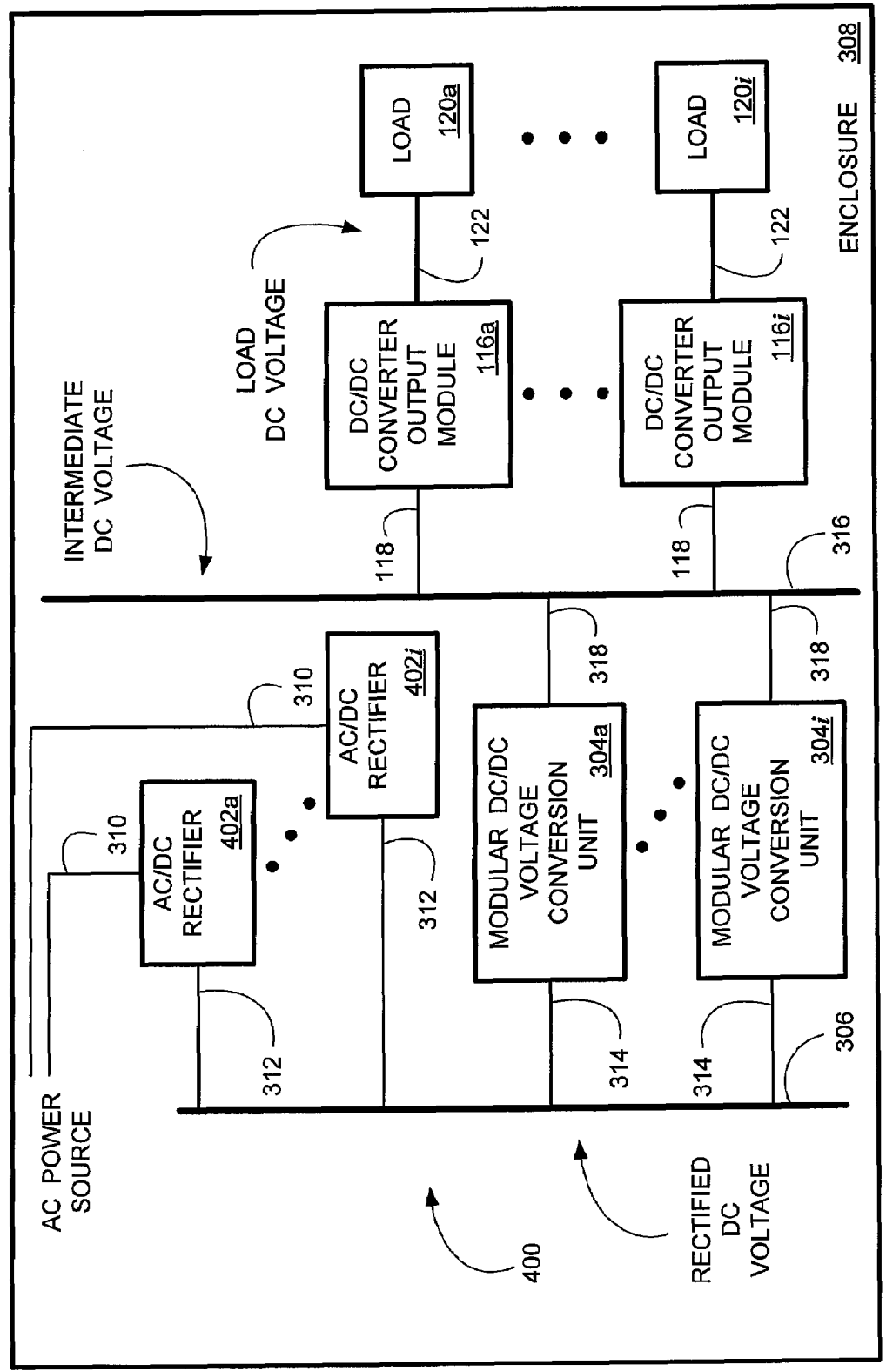
FIG. 4 is a block diagram illustrating an embodiment of a separated front end rectifier power system employing two or more modular AC/DC rectifiers.

FIG. 4 is a block diagram illustrating an embodiment of a separated front end rectifier power system 400 employing two or more modular AC/DC rectifiers 402a through 402i. Reliability is improved in that loss of one of the modular AC/DC rectifiers does not result in outage of the electronic system since power is provided by the remaining modular AC/DC rectifier. Such flexibility in using a plurality of modular AC/DC rectifiers provides cost saving and space saving benefits, much like the benefits of using the modular DC/DC conversion units 304a-304i described above. Additional modular AC/DC rectifiers may be installed while maintaining the above described length associated with the separated front end rectifier power system 400.

For example, if the total load required is 100 watts (W), the capacity of each of the modular AC/DC rectifiers 402a-402i can be designed for at least 100 W. If a single contingency reliability criteria was applicable for loss of one modular AC/DC rectifier, then two modular AC/DC rectifiers 402a-402i with a capacity of 100 W each can be used in an embodiment of the separated front end rectifier power system 400. That is, upon failure of one of the modular AC/DC rectifiers 402a-402i, the remaining modular AC/DC rectifier can provide the required total capacity of 100 W.

As another example, again assuming that the total load required is 100 watts (W), three modular AC/DC rectifiers each having a capacity of at least 50 W can be employed. If a single contingency reliability criteria was applicable for loss of one modular AC/DC rectifier, then upon failure of one of the modular AC/DC rectifiers, the remaining two modular AC/DC rectifiers can provide the required total capacity of 100 W (50 W each).

Figure 5:
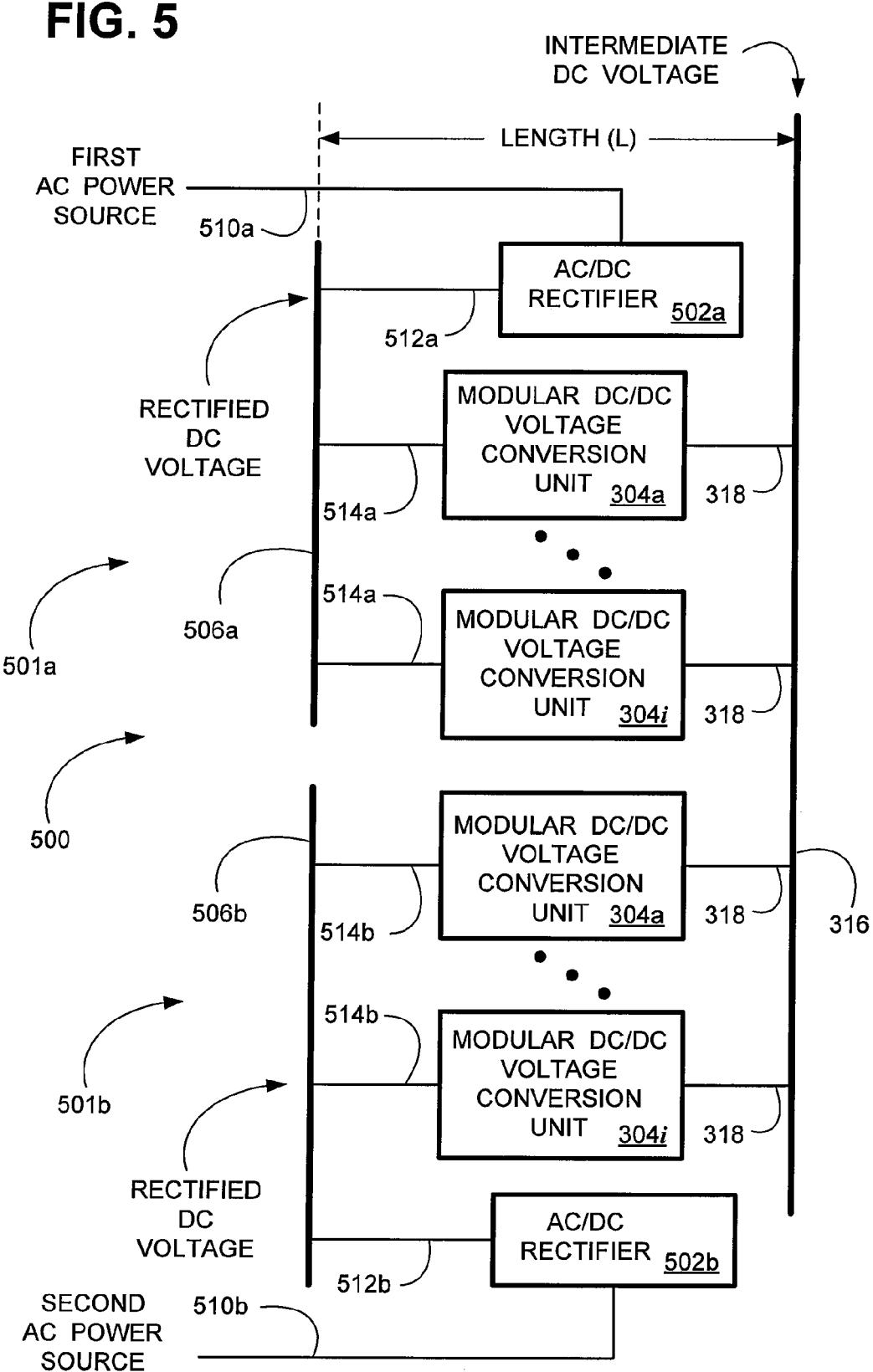
FIG. 5 is a block diagram illustrating an alternative embodiment of a separated front end rectifier power system that provides improved reliability.

FIG. 5 is a block diagram illustrating an alternative embodiment of a separated front end rectifier power system 500 that provides improved reliability. Reliability is improved in that loss of one of the modular AC/DC conversion systems 501a, 501b does not result in outage of the electronic system since power is provided by the remaining modular AC/DC conversion system.

If further reliability is desired, the separated front end rectifier power system 500 may be connected to separate AC power sources. That is, the separation between the first AC power source and the second AC power source may occur far enough back into the AC power distribution system such that the two AC power sources may be considered as being separate for reliability purposes. However, providing separate power sources may incur higher costs. Alternatively, the first AC power source and the second AC power source may be the same power source, thereby avoiding additional costs associated with providing separate AC power sources.

The separated front end rectifier power system 500 comprises a first modular AC/DC conversion system 501*a* and a second modular AC/DC conversion system 501*b*. Each modular AC/DC conversion system 501*a*, 501*b* comprises at least one modular AC/DC rectifier 502*a*, 506*b* (respectively), a plurality of modular DC/DC conversion units 304*a*-304*i*, and a rectified DC voltage bus 506*a*, 502*b* (respectively). The rectified DC voltage busses 506*a*, 506*b* are separate such that the first modular AC/DC conversion system 501*a* and the second modular AC/DC conversion system 501*b* are separate.

Alternating current (AC) power is received by the modular AC/DC rectifier 502*a* from the first AC power source, via connection 510*a*. Alternating current (AC) power is received by the modular AC/DC rectifier 502*b* from the second AC power source, via connection 510*b*.

Connections 510*a*, 510*b* are each illustrated as a single connection for convenience. In various embodiments, connections 510*a*, 510*b* may be a plurality of wire connections depending upon the nature of the AC power source (for example, if AC power is provided as single-phase power, two-phase power or three-phase power). Alternatively, connections 510*a*, 510*b* may be implemented as a coupling device configured to couple to a corresponding device on an AC power system.

The received AC power from the first power source is converted to direct current (DC) by the modular AC/DC rectifier 502*a* and output at the rectified DC voltage. Rectified DC power/voltage/current is output onto the rectified DC voltage bus 506*a*, via connection 512*a*. The rectified DC power/voltage/current is provided to the modular DC/DC conversion units 304*a*-304*i*, via connections 514*a*.

Similarly, the received AC power from the second power source is converted to direct current (DC) by the modular AC/DC rectifier 502*b* and output at the rectified DC voltage. Rectified DC power/voltage/current is output onto the rectified DC voltage bus 506*b*, via connection 512*b*. The rectified DC power/voltage/current is provided to the modular DC/DC conversion units 304*a*-304*i*, via connections 514*b*. In some embodiments, the rectified DC voltage provided to the rectified DC voltage bus 506*b* is different from the rectified DC voltage provided to the rectified DC voltage bus 506*a*.

As described above, the modular DC/DC conversion units 304*a*-304*i* convert the received rectified DC voltage into an intermediate DC voltage. The intermediate DC voltage is provided to the intermediate DC voltage bus 316, via connections 318.

Figure 6:
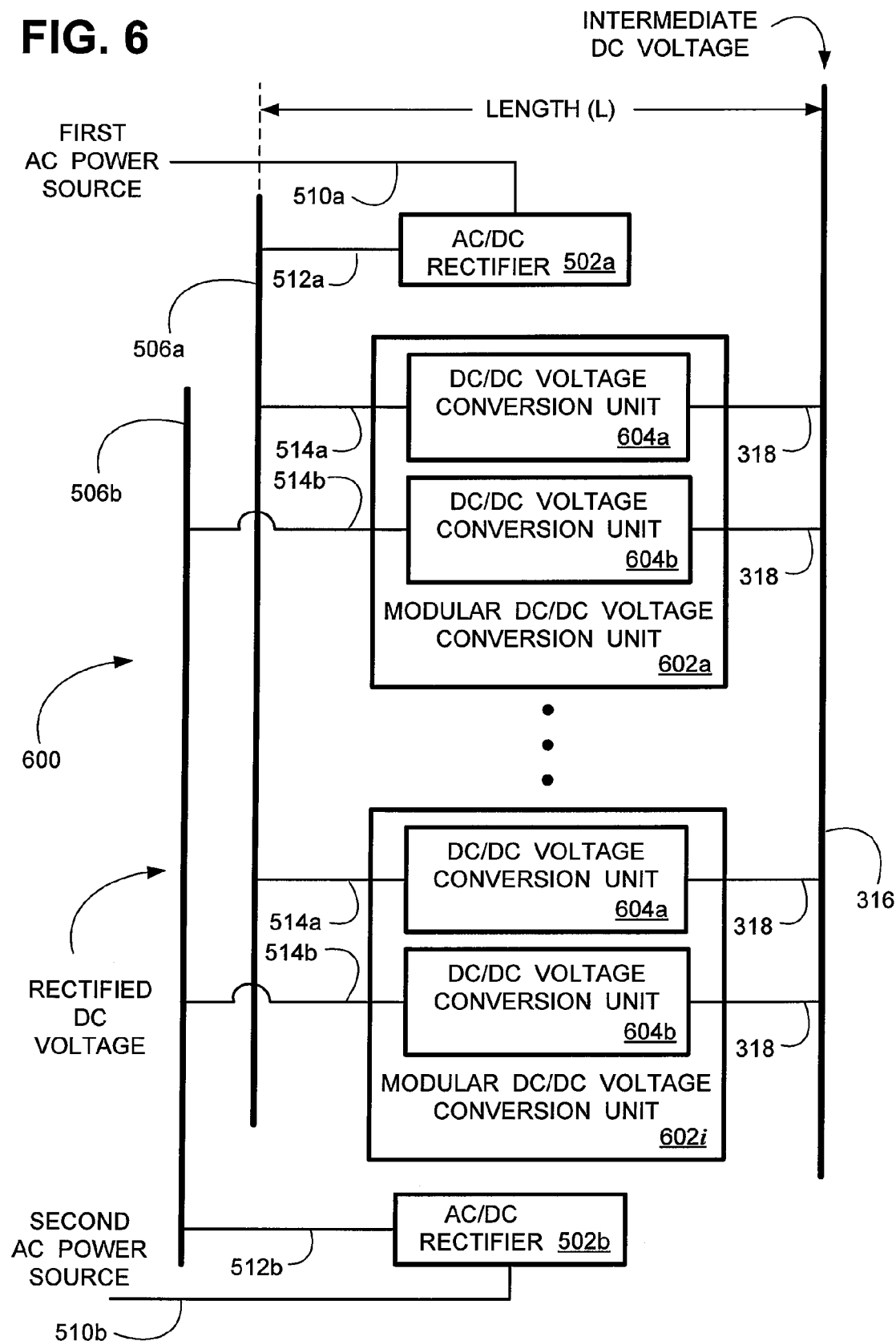
FIG. 6 is a block diagram illustrating an alternative embodiment of a separated front end rectifier power system that employs modular DC/DC voltage conversion units.

FIG. 6 is a block diagram illustrating an alternative embodiment of a separated front end rectifier power system 600 that employs modular DC/DC voltage conversion pairs 602*a*-*i*. Like the above described separated front end rectifier power system 500 (FIG. 5), the separated front end rectifier power system 600 has separated power conversion systems and two separate rectified DC voltage busses 506*a* and 506*b*. However, the separated front end rectifier power system 600 uses a plurality of modular DC/DC voltage conversion pairs 602*a*-*i*, each having two DC/DC conversion units 604*a* and 604*b*. The DC/DC conversion unit 604*a* is coupled to the rectified DC voltage bus 506*a* via connection 514*a* such that DC power is received from the modular AC/DC rectifier 502*a*. The DC/DC conversion unit 604*b* is coupled to the rectified DC voltage bus 506*b* via connection 514*b* such that DC power is received from the modular AC/DC rectifier 502*b*.

With the separated front end rectifier power system 600 embodiment, reliability is improved in that loss of one of the modular DC/DC voltage conversion units 601*a*-*i* does not result in outage of the electronic system since power is provided by the remaining modular DC/DC voltage conversion pairs 601*a*-*i*. Such flexibility in using a plurality of modular DC/DC voltage conversion pairs 601*a*-*i* provides cost saving and space saving benefits, much like the benefits of using the modular DC/DC conversion units 304*a*-304*i* described above.

Figure 7:
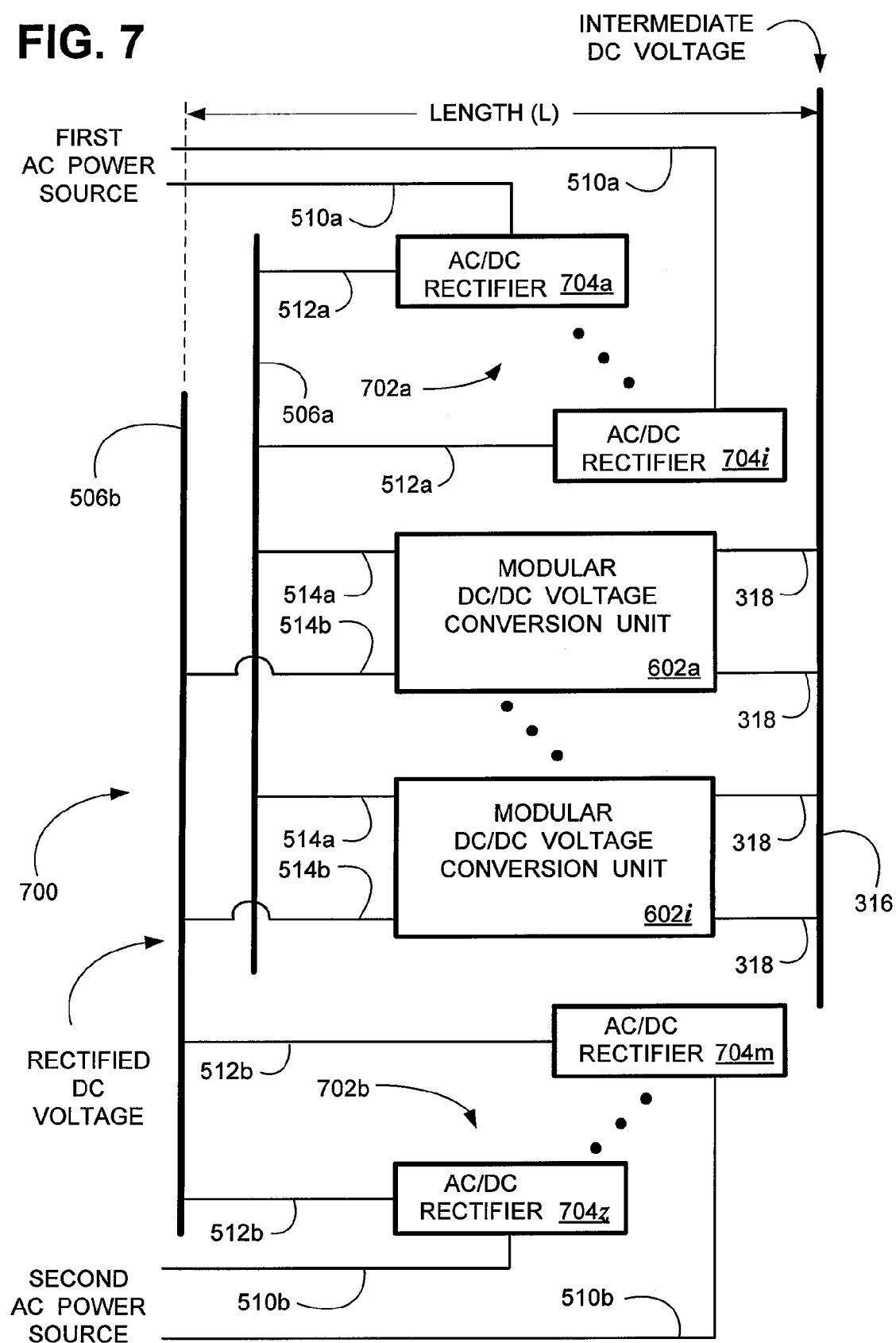
FIG. 7 is a block diagram illustrating an alternative embodiment of a separated front end rectifier power system with two groups of AC/DC rectifiers.

FIG. 7 is a block diagram illustrating an alternative embodiment of a separated front end rectifier power system 700 with two groups of AC/DC rectifiers 702*a* and 702*b*. AC/DC rectifier group 702*a* comprises a plurality of AC/DC rectifiers 704*a*-*i*. Similarly, AC/DC rectifier group 702*b* comprises a plurality of AC/DC rectifiers 704*m*-*z*.

With the separated front end rectifier power system 700 embodiment, reliability is improved in that loss of one of the AC/DC rectifiers 704*a*-*i* or 704*m*-*z* does not result in outage of its respective AC/DC rectifier group since power is provided by the remaining AC/DC rectifiers. Such flexibility in using a plurality of AC/DC rectifiers 704*a*-*i* or 704*m*-*z* in the rectifier groups 702*a* and 702*b*, respectively, provides cost saving and space saving benefits, much like the benefits of using the modular DC/DC conversion units 304*a*-304*i* described above.

Figure 8:
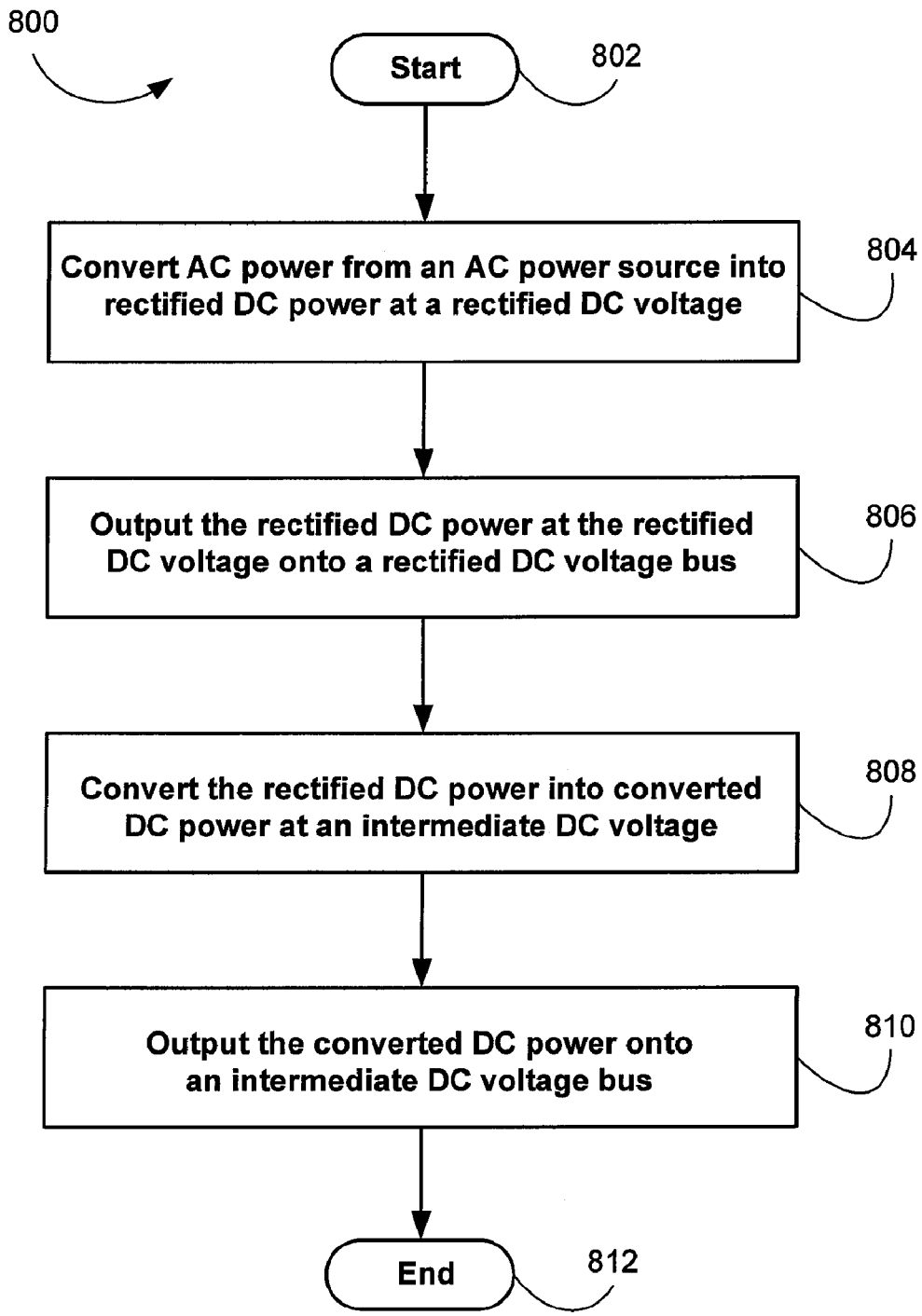
FIG. 8 is a flowchart illustrating an embodiment of a process for providing intermediate DC power/voltage using embodiments of the separated front end rectifier power system.

FIG. 8 shows a flow chart 800 illustrating a process used by embodiments of separated front end rectifier power systems 300, 400, 500, 600 and 700 (FIGS. 3-7, respectively). It should also be noted that in alternative embodiments, the functions noted in the blocks may occur out of the order noted in FIG. 8, or may include additional functions. For example, two blocks shown in succession in FIG. 8 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process begins at block 802. At block 804, AC power from an AC power source is converted into rectified DC power at a rectified DC voltage. At block 806, the rectified DC power at the rectified DC voltage is output onto a rectified DC voltage bus. At block 808, the rectified DC power is converted into converted DC power at an intermediate DC voltage. At block 810, the converted DC power is output onto an intermediate DC voltage bus. At block 812, the process ends.

In systems having two rectified DC busses, the above-described process is modified. AC power from a second AC power source is converted into a second rectified DC power at a second rectified DC voltage. Then, the second rectified DC power is output onto a second rectified DC voltage bus. Next, the second rectified DC power is converted into a second converted DC power at the intermediate DC voltage. Finally, the second converted DC power is output onto the intermediate DC voltage bus.

It should be emphasized that the above-described embodiments are merely examples of the disclosed systems and methods. Many variations and modifications may be made to the above-described embodiments. All such modifications and variations are intended to be included herein within the scope of this disclosure.

At least the following is claimed:

1. A method of converting alternating current (AC) power into direct current (DC) power at an intermediate DC voltage, the method comprising:
converting AC power from an AC power source into rectified DC power at a rectified DC voltage;
outputting the rectified DC power at the rectified DC voltage onto a rectified DC voltage bus;
converting rectified DC power from the rectified DC voltage bus into converted DC power at an intermediate DC voltage through a plurality of direct current to direct current (DC/DC) conversion units;
outputting the converted DC power at the intermediate DC voltage onto an intermediate DC voltage bus; and
converting converted DC power from the intermediate DC voltage bus into DC power at a load DC voltage.

2. The method of claim 1, further comprising:
converting AC power from a second AC power source into a second rectified DC power at a second rectified DC voltage;
outputting the second rectified DC power onto a second rectified DC voltage bus;
converting the second rectified DC power into a second converted DC power at the intermediate DC voltage; and
outputting the second converted DC power onto the intermediate DC voltage bus.

3. The method of claim 1, further comprising:
determining a total power required by an electronic system;
defining a reliability criteria for outage of one of a plurality of components of a separated front end rectifier system that converts the AC power into the converted DC power;
determining a number of the plurality of components such that after outage of at least one of the components, capacity of the remaining components at least equals the determined total power.

4. The method of claim 3, wherein the plurality of components are modular alternating current to direct current (AC/DC) rectifiers or modular direct current to direct current (DC/DC) conversion units.

5. A separated front end rectifier system that provides intermediate voltage, direct current (DC) power to a plurality of loads, comprising:
a modular alternating current to direct current (AC/DC) rectifier coupled to an AC power system that converts received AC power to DC power at a rectified DC voltage;
a rectified DC voltage bus coupled to the AC/DC rectifier to receive DC power at the rectified DC voltage;
a plurality of modular direct current to direct current (DC/DC) conversion units coupled to the rectified DC voltage bus, where the plurality of modular DC/DC conversion units convert received DC power at the rectified DC voltage into DC power at an intermediate DC voltage;
an intermediate DC voltage bus coupled to the plurality of modular DC/DC conversion units to receive DC power at the intermediate DC voltage; and
at least one modular direct current to direct current (DC/DC) converter output module coupled to the intermediate DC voltage bus that converts received DC power at the intermediate DC voltage to DC power at a load DC voltage.

6. The separated front end rectifier system of claim 5, further comprising:

a first modular AC/DC conversion system, comprising the modular AC/DC rectifier, the rectified DC voltage bus and the plurality of modular DC/DC conversion units such that AC power received from a first AC power source undergoes conversion; and
a second modular AC/DC conversion system, comprising a second modular AC/DC rectifier, a second rectified DC voltage bus and at least one other modular DC/DC conversion unit such that AC power received from a second AC power source undergoes conversion.

7. The separated front end rectifier system of claim 6, wherein received power from the first AC power source is converted into DC power by the first modular AC/DC conversion system and is output at the intermediate DC voltage onto the intermediate DC voltage bus, and wherein the received power from the second AC power source is converted into DC power by the second modular AC/DC conversion system and is output at the intermediate DC voltage onto the intermediate DC voltage bus.

8. The separated front end rectifier system of claim 6, wherein the first modular AC/DC conversion system further comprises a plurality of first modular AC/DC rectifiers coupled to the first AC power source, and wherein the second modular AC/DC conversion system further comprises a plurality of second modular AC/DC rectifiers coupled to the second AC power source.

9. The separated front end rectifier system of claim 6, wherein the second modular AC/DC conversion system further comprises a plurality of other modular DC/DC conversion units coupled between the second rectified DC voltage bus and the intermediate DC voltage bus.

10. The separated front end rectifier system of claim 6, further comprising at least one modular DC/DC voltage conversion pair, the modular DC/DC voltage conversion pair comprising one of the plurality of modular DC/DC conversion units of the first modular AC/DC conversion system and the other modular DC/DC conversion unit.

11. The separated front end rectifier system of claim 6, wherein the first AC power source and the second AC power source are the same power source.

12. The separated front end rectifier system of claim 6, wherein the first AC power source and the second AC power source are different power sources.

13. The separated front end rectifier system of claim 6, wherein the first rectified DC voltage and a second rectified DC voltage are a same DC voltage.

14. The separated front end rectifier system of claim 6, wherein the first rectified DC voltage and a second rectified DC voltage are different DC voltages.

15. The separated front end rectifier system of claim 5, further comprising a plurality of modular AC/DC rectifiers coupled to the AC power system that converts the received AC power to DC power at the rectified DC voltage.

16. A system for converting alternating current (AC) power into direct current (DC) power at an intermediate DC voltage, comprising:
means for converting AC power from an AC power source into rectified DC power at a rectified DC voltage;
means for outputting the rectified DC power at the rectified DC voltage onto a rectified DC voltage bus;
a plurality of means for converting the rectified DC power from the rectified DC voltage bus into converted DC power at an intermediate DC voltage such that the converted DC power is output onto an intermediate DC voltage bus; and means for converting converted DC power from the intermediate DC voltage bus into DC power at a load DC voltage.

17. The system of claim 16, further comprising:

means for converting AC power from a second AC power source into a second rectified DC power at a second rectified DC voltage;

means for outputting the second rectified DC power onto a second rectified DC voltage bus; and means for converting the second rectified DC power into a second converted DC power at the intermediate DC voltage such that the second converted DC power is output onto the intermediate DC voltage bus.

* * * * *